Oct. 24, 1950 — P. WROBLEWSKI — 2,526,791
FASTENING DEVICE
Filed Sept. 29, 1945 — 2 Sheets-Sheet 2
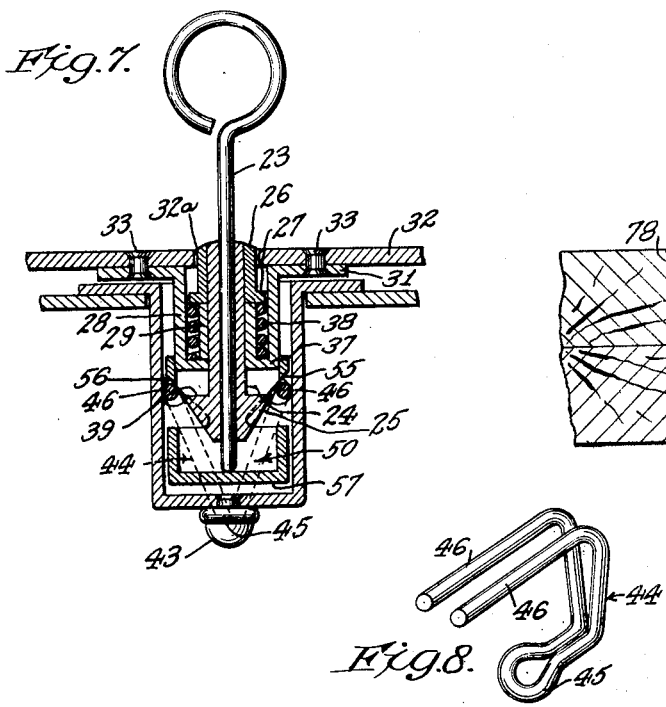
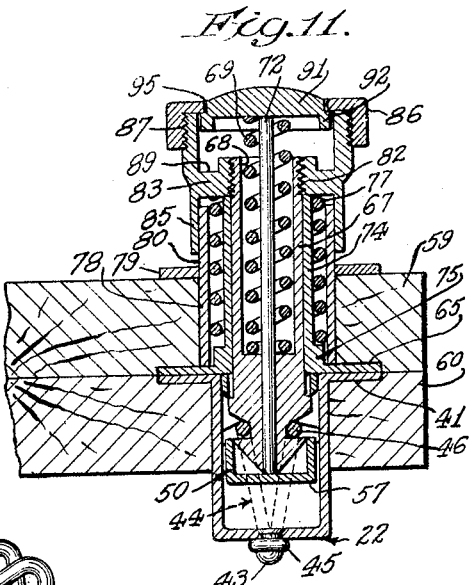
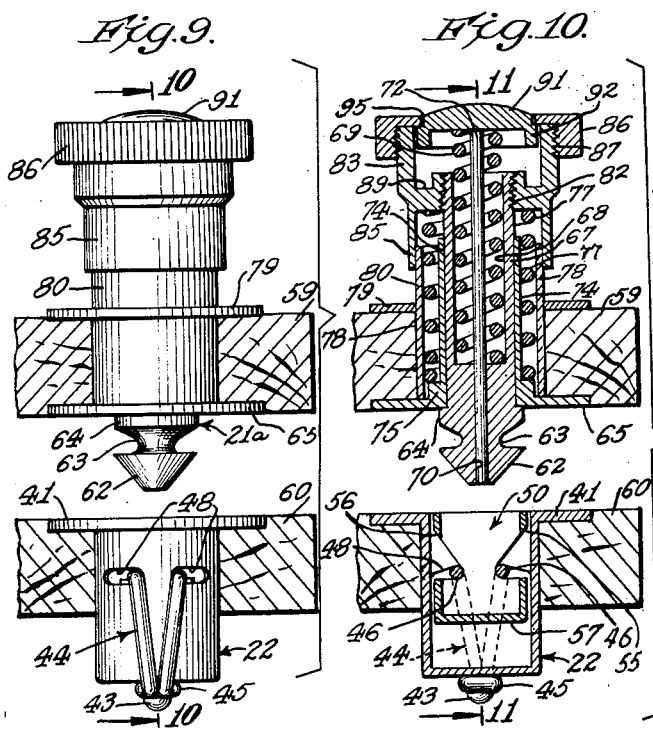
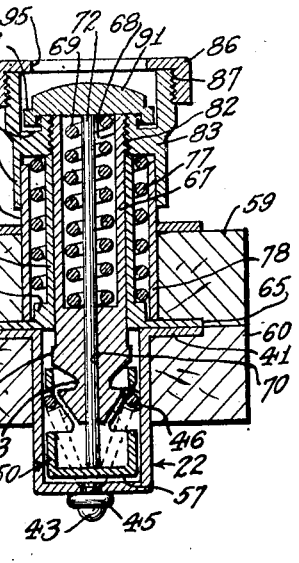
INVENTOR.
Polikarp Wroblewski
BY Furman Rinehart
ATTORNEY

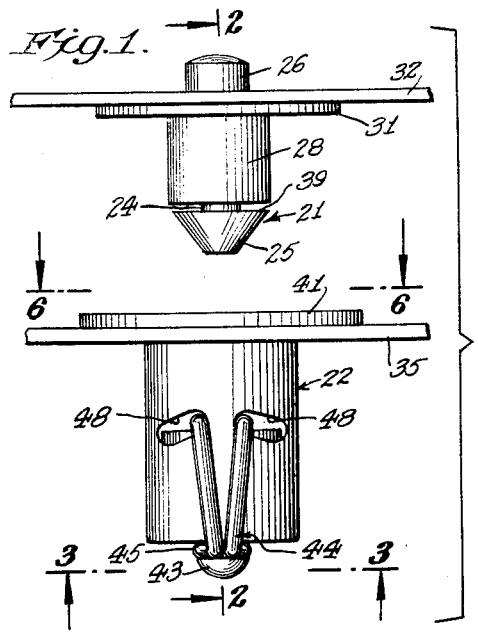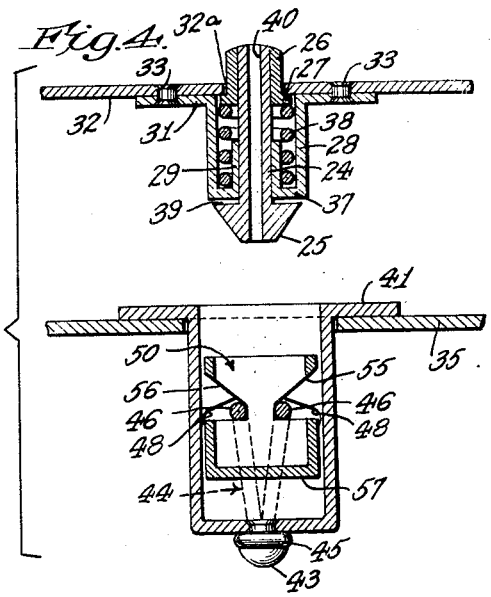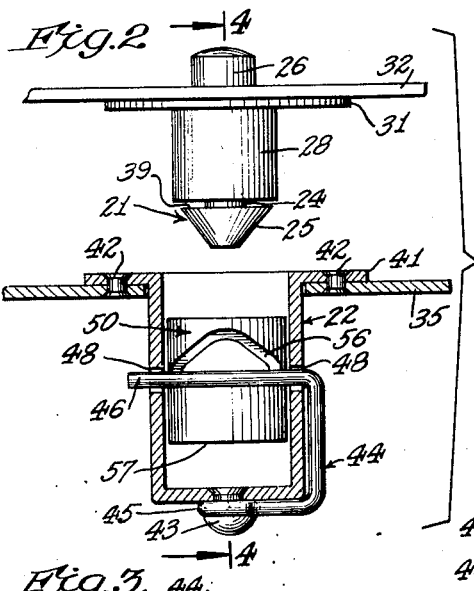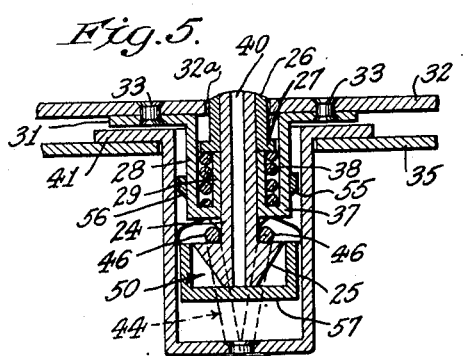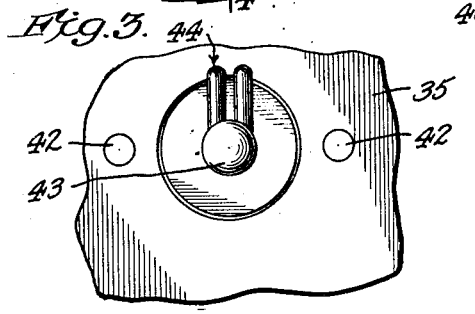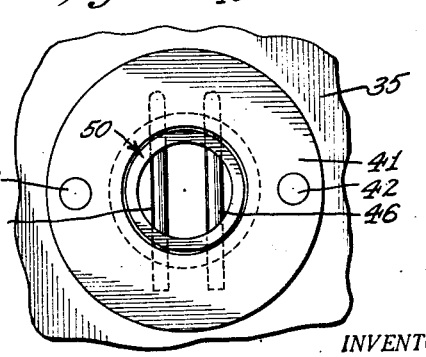

UNITED STATES PATENT OFFICE 2,526,791

FASTENING DEVICE

Polikarp Wroblewski, Ankara, Turkey, assignor of one-half to Frederick Archibald Pillet, Dallas, Tex.

Application September 29, 1945, Serial No. 619,278

7 Claims. (Cl. 85—7)

This invention relates to fastening devices, more particularly to a separable fastener especially adapted for use in securing metal plates to a supporting plate or surface as utilized, for example, on access doors, inspection doors, plates, or covers, cowling panels, and similar parts of aircraft. It is also concerned with separable fasteners as used on other devices, such as on cabinets, electric refrigerators, iceboxes, and other types of household articles.

This application is, in part, a continuation of my copending application, Serial Number 590,177, filed April 25, 1945.

In aircraft design it is usual to utilize fairly rigid plates, doors, or covers, carefully manufactured to fit the openings for which they are designed. It has been a difficult problem to devise securement means, such as separable fasteners, capable of holding plates, panels, or doors of such a rigid character securely in place, which fasteners will, at the same time, permit ready separation of the secured members without excessive effort being required. Previous to the separable fasteners disclosed in my copending patent application satisfactory securement members of this type were not available for use in the aircraft and other industries requiring such fasteners.

In my copending application Serial Number 590,177, separable fasteners of a new and improved type are disclosed, which fasteners may be locked merely by forcing a grooved stud into a locking receptacle, and which may be readily unlocked by the insertion of a wire unlocking key into an aperture extending through the grooved stud. The possibility of accidental opening of the separable fastener is completely eliminated, yet only a slight pressure with the unlocking key against a keeper positioned in the locking receptacle is necessary to permit immediate separation of the stud from the locking receptacle. The separable fasteners disclosed in the said pending application are also characterized, in one form disclosed therein, by indicator means to indicate whether the separable fastener is locked or unlocked.

I have now devised certain new and improved separable fasteners which utilize the general principles characteristic of those disclosed in my application Serial Number 590,177, but which constitute, in certain important particulars, an improvement over those disclosed in that application in that, among other things, the stud is movable relatively to the male part of the fastener upon which the stud is mounted. The improved separable fasteners with which this application is concerned are capable of being used with very rigid doors or other closure elements, since they are adapted to open instantly upon insertion of the wire unlocking key, even though the fastener is used on closure members having a high degree of rigidity. They are inexpensive to manufacture, having only a few simple operating parts, and are provided with simple and reliable means for telling at a glance whether the separable fastener is locked or unlocked. In one embodiment of my invention as herein disclosed the wire unlocking key is built in to form a permanent part of the separable fastener, and is capable of being opened by lightly touching a button or knob with which the wire unlocking key is operatively associated. This embodiment of my invention, especially desirable for use on household cabinets, electric refrigerator, iceboxes, and similar devices, includes in conjunction therewith all the enumerated advantages of positive action, cheapness and simplicity of manufacture, and positive means to indicate whether the fastener is locked or unlocked.

Accordingly, it is one of the objects of my invention to provide a separable fastener of an improved type, particularly adapted for use in aircraft for retaining in place access doors, inspection plates, doors, or covers, hatch covers, cowling panels, etc., and other elements normally held together on aircraft by means of separable fastening devices, but which is also adapted for use on household refrigerators and similar devices, which separable fastener is of relatively simple construction, inexpensive to manufacture, yet adapted to provide a positive and secure closure until unlocked by the action of an unlocking key.

It is another object of this invention to provide a separable fastener of the type described which may be rapidly closed and locked, and which may also be unlocked rapidly, without undue effort, when separation of the two main parts of the fastener, and the elements to which they are secured, is desired.

It is a further object of this invention to provide a separable fastener of this improved type which is simple and reliable in its operation, so constructed as to eliminate all possibility of accidental opening, which fastener is provided with simple and reliable means to permit one to tell at a glance whether the grooved stud is properly locked in the locking receptacle. This is a safety feature of considerable importance, for it is often important on aircraft and elsewhere to know immediately by simple visual inspection, whether the fastener is locked or unlocked.

It is still another object of this invention to provide fastening elements, capable of use on aircraft and elsewhere which do not have any projecting parts which might protrude or project from the elements separably secured together with the introduction of resulting undesirable air resistance.

Still an additional object of my invention, in one of its preferred embodiments, is to provide a wire unlocking key which is permanently built into the fastener as a part of the complete assembly and which, after use to unlock the separable fastener, remains permanently in place until it is again needed for use in bringing about separation of the elements held in secured relationship. This construction, in which danger of losing the unlocking key is eliminated, is of particular importance where the separable fastener is to be used on refrigerator doors, cabinets, household closets, and for similar purposes.

The foregoing aims and objects, as well as others, will be exemplified by the ensuing disclosure of certain embodiments of my invention.

Although the novel features, which are believed to be characteristic of this invention, will be particularly pointed out in the claims appended hereto, the invention itself, its objects and advantages and the manner in which it may be carried out, may be better understood by reference to the following detailed description, taken in connection with the accompanying drawings, forming a part hereof, in which:

Fig. 1. is a view in elevation of the grooved stud and locking receptacle therefor in one embodiment of my invention, the male and female parts being shown separated;

Fig. 2 is a cross-sectional view, some parts being shown in elevation, of the grooved stud and locking receptacle, this section being taken on the line 2—2 of Fig. 1;

Fig. 3 is a end rear view in elevation of the locking receptacle, looking in the direction 3—3 as indicated in Fig. 1;

Fig. 4 is a view in cross-section, some parts being shown in elevation, of the grooved stud and locking receptacles, this view being taken on the line 4—4 of Fig. 2;

Fig. 5 is a cross-sectional view of the grooved stud and locking receptacle similar to Fig. 4, the stud being shown, however, in locked position in the locking receptacle;

Fig. 6. is a front view of the locking receptacle looking in the direction 6—6 as indicated in Fig. 1;

Fig. 7 is a cross-sectional view of the locking receptacle and grooved stud, similar to Fig. 5, except that it shows the unlocking wire key in place, and the stud in the position it assumes after moving outwardly a short distance under the action of the separating spring, after pressure of the unlocking key has operated to spread the latch wires apart;

Fig. 8 is a detail view of the spring wire latch for securing the grooved stud in the locking receptacle;

Fig. 9 is a view in elevation of a modified form of my fastening device, the grooved stud and locking receptacle comprising the separable fastener being illustrated as applied to refrigerator doors of similar closure elements;

Fig. 10 is a view in cross-section of the modified form of my fastening device taken on the line 10—10 of Fig. 9, this view showing the grooved stud and locking receptacle separated;

Fig. 11 is a cross-sectional view of this modified form taken on the line 11—11 of Fig. 10, this view showing the grooved stud locked in the locking receptacle; and Fig. 12 is a view similar to Fig. 11 except that the separable fastener is illustrated in the position assumed by the grooved stud in the locking receptacle after the spring wire latch has been spread apart by action of the keeper and unlocking wire key. This unlocking wire key is permanently secured in place as a part of the separable fastener in this modification of my invention.

Referring more particularly to the modification of my separable fastener shown in Figs. 1 to 8 inclusive, my fastener is particularly adapted for securing the grooved stud 21 of a male part in the cylindrical locking receptacle 22 of a female part, retaining it in the locking receptacle in locked condition until its release is permittted by insertion of the unlocking wire key 23 as shown in Fig. 7. As decribed below, the male part which includes the grooved stud is secured to the latch cover, door, or other closure element, and the female part which includes the locking receptacle is secured to the main body structure or frame in which that closure element is adapted to be positioned.

For convenience of description the term "male part" is used to designate the part which carries the stud and may be, for example, a member such as indicated by reference characters 32 or 53 or such part may be a supporting member as a part of the fastener which may be secured to a latch cover, door or other closure element to support the stud. The term "female part" is used to designate the part of the fastener which carries the locking receptacle and may be, for example, a member such as indicated by reference characters 35 and 60 or such part may be a supporting member as a part of the fastener which may be secured to the main body structure or frame to support the locking receptacle. And it will be understood that in certain instances the male and female parts may be arranged vice versa; that is, the male part may be secured to the body structure and the female part may be secured to the closure element.

The grooved stud 21 includes the shank portion 24 and head portion 25. The shank portion, at the end remote from head 25, is provided with the indicator cap 26 having flange portion 27. This indicator cap is secured to the shank 24 in any suitable manner. It may, for example, be held on the shank by a drive fit, or it could be keyed or milled thereto, as desired. As shown, the head 25 may be advantageously formed integrally with the shank 24, but it might also be separate therefrom, in which case it would be secured thereto in any suitable manner. The shank 24 and the indicator cap 26 are positioned in a cylindrical housing 28, which is formed with an interior cylindrical guide portion 29. The shank 24 is adapted to slide axially within this guide portion, and the indicator cap 26, secured to the shank 24, also slides axially within the cylindrical housing.

The housing 28 is formed at its end remote from the guide portion 29 with the flange 31. This flange may be secured to plate 32 by means of rivets 33, or any other suitable securement means may be utilized for securing the housing to the plate. Thus, if desired, the flange 31 may be welded to plate 32. As utilized in practical construction the plate 32 might be an inspection door, hatch cover, cowling plate, or other closure element on an airplane, or it might represent any plate, hatch, door or closure element which is to be separably secured to another plate 35 with which the locking receptacle 22 is associated.

Within the cylindrical housing 28, between indicator cap 26 and the bottom plate 37, there is positioned a helical compression spring 38. This spring tends to force the indicator cap 26 outwardly. Since the indicator cap is secured to the shank 24 of the grooved stud 21, the entire stud, including shank 24 and tapered head 25, is also urged outwardly in the housing 28, until the flat portion or base 39 of the tapered head is pressed into contact with the lower surface of the bottom plate 37. If pressure is applied against the indicator cap 26, however, the shank 24 and tapered head 25, as well as the indicator cap itself, can be moved downwardly against the action of the spring 38 until the indicator cap is entirely within the housing, and the base 39 of the tapered head 25 is spaced from the bottom plate 37. Plate 32 is formed with an aperture 32a through which the indicator cap 26 protrudes when the helical compression spring 38 has urged the indicator cap 26 outwardly until its flange 27 is in contact with the plate 32. The position of the indicator cap with reference to this plate serves to indicate the position of the tapered head 25 with reference to the bottom plate 37, and thus serves to indicate when the grooved stud 21 is locked in the locking receptacle 22. This will be apparent from Fig. 5 which illustrates the locked position of the separable fastener. A bore or aperture 40 extends entirely through the shank 24, tapered head 25, and indicator cap 26. Through this aperture the unlocking wire key 23 (Fig. 7) is introduced when unlocking the separable fastener to permit separation of the grooved stud 21 from the locking receptacle 22.

The cylindrical locking receptacle 22 is formed with an annular flange or collar 41 which may be secured by rivets 42, by welding, or by other securement means to the plate 35. This plate may be any member which is to be held by a separable fastener to another member, illustrated as the plate 32. For example, in practised construction, it may represent the fuselage of an airplane to which a cowling plate is to be secured, or to which an inspection door or cover (represented by the numeral 32) is to be removably secured in locked position.

The cylindrical locking receptacle 22 is provided with a bolt or rivet 43 in its end section, this bolt or rivet serving to secure the spring wire latch 44 (shown in detail in Fig. 8) in operative relationship with the receptacle. As shown in Fig. 8, the spring wire latch 44 is bent to provide a loop 45 which is held in place against the end of the receptacle 22 by the bolt or rivet 43, and with two parallel straight portions or tines 46 which extend into the receptacle 22 and serve as the latch, fitting in the groove of the stud 21 which groove is provided by the upper surface or base 39 of tapered head 25 adjacent the stud shank 24 and below the bottom plate 37. In this position the latch wires serve to hold the stud in place in the locking receptacle when the male and female parts of the separable fastener are locked together.

The tapered head 25 of the stud 21 is shaped to spread the latch wires 46 apart when the stud is pressed into the locking receptacle 22, and the wires 46, because of the springy or resilient arrangement of the spring wire latch 44, will spring back to latch the stud in place after the tapered head 25 has passed beyond the latch wires.

The locking receptacle 22 is also provided with the four slotted holes 48 through which the latch wires 46 pass, each wire extending through two of the apertures. The latch wires are adapted to move in the slotted holes 48 during insertion of the tapered head 25 of the stud 21 in the locking receptacle 22 during the step of locking the fastener. They also travel in these slotted holes during the unlocking operation, wherein unlocking wire key 23 is utilized, as will subsequently be described. Seated in the locking receptacle 22 is the keeper 50. This keeper is adapted to move axially with respect to the locking receptacle to a limited extent against the action of the spring wire 44. It may also move axially in the reverse direction to a limited extent under the action of this spring. As shown, the keeper 50, which is open at its exterior end to permit entry of the grooved stud 21, is generally cylindrical in form, but the cylinder is cut away at that portion thereof fitting within the locking receptacle to provide the two camming surfaces 55 and 56. The tine portion or latch wires 46 of the spring wire latch 44 bear against these camming surfaces. When the keeper 50 is forced into the locking receptacle, as shown in Fig. 7, as by pressure of the wire unlocking key 23, the camming surfaces serve to spread apart the latch wires 46 riding thereon. In order to facilitate this action the keeper 50 is provided at its lower end with the bottom plate 57, against which the wire unlocking key is pressed to force the keeper into the locking receptacle when unlocking the separable fastener. When pressure against the bottom plate 57 of the keeper 50 is released, as by removing the unlocking key 23, the spring action of the spring wire latch 44 acts to force the keeper 50 axially outwardly in the locking receptacle, the latch bearing against the camming surfaces 55 and 56 and returning to their normal or locked position as shown, for example, in Figs. 4 and 6.

The locked position of grooved stud 21 in the locking receptacle 22 of the separable fastener is illustrated in Fig. 5. The latch wires 46 are spread apart when the tapered head 25 of the stud 21 is inserted into the locking receptacle. When pressure is applied to the indicator cap 26 in forcing the tapered head into the locking receptacle, it is moved inwardly in cylindrical housing 28 against the action of the spring 38, thus further compressing this spring. As the tapered head 25 spreads the latching wires 46 apart in entering the locking receptacle and keeper 50, the tapered head is permitted to move easily into the locking receptacle.

After passage of the tapered head beyond the latch wires, the spring action of spring wire latch 44 causes them to spring back, the latch wires or tines 46 coming toward each other again back of base 39 of the tapered head 25, until they make contact with shank 24. The latch wires are thus retained back of the tapered head and serve to lock the stud 21 in place in the locking receptacle 22. It is evident that the spring 38 is compressed, and the indicator cap 26 moved axially in the housing 28 until its upper surface is substantially flush with the outer surface of the plate 32, during the process of locking the separable fastener. The fastener is then in the locked position illustrated in Fig. 5, and plates or elements 32 and 35 are held tightly together in locked condition. No part of the fastener projects beyond the plate 32 for any substantial distance. This freedom from projecting parts is of especial advantage in aircraft and elsewhere where the protrusion of a part may introduce undesirable wind resistance.

When it is desired to unlock the fastener and separate the stud 21 from the locking receptacle 22, as well as the plates or other elements carried thereby, all that it is necessary to do is to insert the wire locking key 23 through the bore 40 provided in the stud 21 until the end of the key presses against the bottom plate 57 of the keeper 50. If the unlocking key 23 were not available or if it should have been lost or mislaid, the unlocking operation could be effected by using any stout piece of wire that happened to be at hand.

What occurs when pressure is applied by means of the unlocking wire key 23 against the contact or bottom plate 57 of the keeper 50 is illustrated in Fig. 7. The keeper 50, as shown in Fig. 7, is forced inwardly into the locking receptacle 22 against the action of the spring wire latch 44. This movement spreads apart the latch wires 46, which are forced outwardly, riding on the camming surfaces 55, 56 cut or formed in the keeper. Since the tapered head 25 is no longer held by the latch wires in fixed relationship with respect to the other parts of the separable fastener, compression spring 38 acts to exert pressure against the lower surface of the flange 27 which is fixedly secured to the shank 24 of the stud 21. This pressure forces indicator cap 26 and shank 24 outwardly in the housing 28, the cap moving upwardly and out through the aperture 32a until its flange portion 27 is stopped by striking against the lower surface of the plate 32. This movement caused by spring 38 serves to withdraw the grooved head 25 from between the latch wires 46 by a positive withdrawal force, thus providing an ejecting force for separating the grooved stud 21 (and the plate 32 carried thereby) from the locking receptacle 22. At the same time the stud is moved outwardly sufficient distance that the tines 46 cannot engage the stud head back of the retaining surface or shoulder 39 of the stud head. Hence the stud remains unlocked until pressure is again applied to the cap 26 of the stud. As the tapered head 25 is released and pressure of the wire unlocking key removed, the keeper 50 is again urged outwardly to its original position in the locking receptacle, as illustrated in Figs. 2 and 4, by action of the spring wire latch member 44, the latch wires 46 at the same time moving inwardly to their locking position along camming surfaces 55, 56. In order to effect the release of the grooved stud from the locking receptacle it is evident that only a slight impact or push with the key 23 against the contact plate 57 is necessary, the key being then withdrawn from the separable fastener until necessary for further use as an unlocking key.

It is apparent that the separable fastener described may be locked again at any time, as desired, simply by pressing on the end of the indicator cap 26 and forcing the tapered head 25 to spread apart the latching wires 46, thus entering the keeper 50 and the locking receptacle 22. When separation or release is desired all that is necessary is to insert the unlocking key 23 through the aperture 40 into contact with the contact or bottom plate 57 of the keeper 50. And it is significant to note that the unlocking action is not impeded by any separation of the two parts comprising the separable fastener, since separation of the two parts occurs with positive ejecting force through the action of a compression spring forming a part of the male part. Moreover, it is possible to tell at a glance by the position of the indicator cap 26 whether the separable fastener is locked or unlocked. If the top of the cap 26 is flush, or substantially flush, with the outer surface of the plate 32, then the separable fastener is locked, but if the cap stands above the outer surface of this plate, as shown in Figs. 2 and 4, it is immediately apparent that the fastener is not locked. This is a safety feature of considerable importance, as it is frequently necessary, especially on aircraft, to be able to tell at a glance whether the separable fasteners holding the various parts together are in the locked or unlocked condition.

Figs. 9 to 12 illustrate a modified form of my improved separable fastener in which the wire unlocking key is permanently in place as a part of the complete fastener, available for use whenever necessary for effecting release of the grooved stud from the locking receptacle. As this form of the device is particularly useful when utilized on equipment such as iceboxes, cabinets, electric refrigerators, etc., it is shown as applied to a refrigerator closure door, the grooved stud 21a and associated mechanism being positioned in the door 59, and the locking receptacle 22 embedded or otherwise held in the door frame 60.

Referring first to the locking receptacle 22 (Figs. 9–12), it will be noted that it is substantially identical in construction with that shown in the first embodiment of my invention. Thus, it includes cylindrical keeper 50, provided with bottom contact plate 57, the keeper being cut or otherwise formed to provide the camming surfaces 55, 56 for the latch wires 46. The locking receptacle is provided with bolt or rivet 43 in its end section to seat the loop portion 45 of the spring wire latch 44 when tines 46 provide the latch wires, all as in the first embodiment of my invention as illustrated in Figs. 1 to 8 inclusive. It should be noted that the flange 41 of the locking receptacle 22 is embedded in the door frame (or other member) 60, so that its outer surface is substantially flush with the outer surface of the frame. A minor difference from the construction utilized in the first embodiment is that the keeper 50, which is, of course, also axially movable in the locking receptacle 22, in its normal position wherein latch wires 46 are closest together, is substantially flush at its outer edge with the flange 41. In the embodiment illustrated in Figs. 1 to 8 inclusive, the normal position is one in which the outer edge of the keeper 50 is positioned some distance within the locking receptacle 22, below the level of the flange 41.

The grooved stud 21a differs somewhat from stud 21 illustrated in Figs. 1 to 8, but it functions in essentially the same manner as in the first embodiment of my invention. The tapered head 62 is formed with the groove 63 for seating the latch wires 46 when the separable fastener is locked, and with the projecting flange portion 64 which provides a lip portion bearing against the flange plate 65. The shank 67 is suitably bored or otherwise formed at 68 with an aperture for seating the helical compression spring 69, and an aperture 70 of small diameter is provided, extending entirely through the tapered head 62, for the reception of wire unlocking key 72.

Closely surrounding the shank 67 above the projecting flange portion 64, and extending part way up on the shank, is the sleeve 74 provided with an annular flange or stiffening portion 75 which aids in supporting the extending flange plate 65. The stud shank is slidable in this sleeve. As shown, the sleeve 74 and stud shank 67 are positioned in a suitable aperture provided in the member 59, which may, for example, be the door of a refrigerator or other suitable member to be separably secured to member 60, and the flange plate 65 is suitably embedded in a cut out portion of member 59 externally of the sleeve 74, and positioned away therefrom a sufficient distance to provide space for helical compression spring 77 is the metal cylindrical member 78, which serves both as a frame for the aperture provided in the door 59, as well as a guide for the spring 77. As shown, it is provided with a stiffening flange 79, which bears against the member 59, as well as with an upwardly extending portion 80 which extends beyond the aperture provided in the member 60 for the reception of the stud and its associated mechanism.

Secured to the upper end of the stud shank 67, by securement means 82 which may be screw-threading, keying, or other well known means for securing a surrounding cylindrical member to an inner cylindrical member, is the knob-supporting sleeve member 83. This knob-supporting sleeve is provided with downwardly extending bearing portion 85, which surrounds the upwardly extending portion 80 of cylindrical frame member 78. The knob-supporting sleeve 83 is slidable on the fixed sleeve portion 80. The knob 86 is secured to sleeve 83 by screw-threading, keying, or other well known mechanical expedient as illustrated at 87. It should be noted that the interior of the knob-supporting sleeve 83 is shaped to provide a circular groove or recess 89, which is adapted to coact with the unlocking button 91 in a manner which will be subsequently explained.

The unlocking button 91 is formed with a stiffening annular rim portion 92, and is arranged to bear against and contact the upper end of the wire unlocking key 72. The other end of this key, as illustrated, extends almost completely through the aperture 70 in the grooved stud 21a, ending just short of the outermost part of the tapered head 62.

When it is desired to lock the grooved stud 21a in the locking receptacle 22, as, for example, when the door or other closure element represented by numeral 59 is to be closed, the knob 86 is grasped and the tapered head 62 of the grooved stud brought into registry with the keeper 50 in the locking receptacle 22. By pushing inwardly on the knob 86 spring 77 is compressed, and the tapered head 62 forced into the keeper 50 and locking receptacle 22 until the latch wires 46 are spread apart. After the tapered head 62 has passed beyond the latch wires 46, these wires again spring toward each other, because of the spring action of the spring wire latch 44, the latch wires seating in the groove 63 back of the tapered head 62 and holding the stud 21a locked in the locking receptacle 22. This locked condition is illustrated in Fig. 11.

When it is desired to unlatch the separable fastener so that the door or other closure element represented by the numeral 59 may be opened, all that it is necessary to do is to press inwardly on the unlocking button 91. What happens when this is done is illustrated in Fig. 12. The unlocking button may be pressed inwardly against the action of spring 69 until the annular rim 92 fits into recess 89 in knob-supporting sleeve 83.

This movement forces the wire unlocking key 72 against the contact plate 57 of keeper 50, which is forced inwardly in an axial direction into the locking receptacle 22 against the spring action of the spring wire latch 44. The latch wires 46 are forced apart by the movement of the keeper 50, since they bear against the camming surfaces 55, 56 formed thereon, thereby moving these latch wires from the groove 63 and releasing the tapered head 62 of the grooved stud 21. When this occurs the compression spring 77 pressing against knob-retaining sleeve 83 forcibly ejects the grooved stud from the locking receptacle, the stud shank 67 being forced outwardly by the action of spring 77 until projecting flange 64 is stopped by coming into contact with extension flange 65 of sleeve 74. When this occurs the male part comprising the grooved stud and associated mechanism have taken the position illustrated in Fig. 10, and the door or other closure member 59 may be drawn away from its frame 60. When pressure against the unlocking button 91 is released, the spring 69 returns this button to its original position (shown in Fig. 10) in which its rim 92 is forced up against knob 86 at the periphery of the aperture 95 in the face of the knob. At the same time, when pressure of the wire unlocking key 72 against the contact plate 57 is removed, the keeper 50 is returned to its unlocked position shown in Fig. 10 under the action of the spring wire latch 44, the latch wires 46 riding on the camming surfaces 55, 56 until they are as close together as possible, at the bottom of the camming surfaces. The separable fastener may then be relocked by bringing the male and female parts together as above described. The tapered head 62 of grooved stud 21a of the male part is forced into the keeper 50 and locking receptacle 22 of the female part so that this tapered head again spreads apart the latch wires 46 until finally they grasp the groove of the stud.

From the foregoing description it will be seen that the separable fastener provides an efficient and practical closure for use on an electric refrigerator, icebox, cabinet, or other device, wherever an opening is to be closed by a door or other closure element under circumstances where easy opening at a touch, and frequent reclosing and reopening, are encountered.

The terms and expressions which have been employed herein are used as terms of description and not of limitation and there is no intention in the use of such terms and expressions of excluding any equivalent of the features shown and described or portions thereof, but it is recognized that various modifications are possible within the scope of invention claimed.

What is claimed is:

1. A separable fastener having a male part and a female part, a stud on the male part mounted for axial movement relative to said male part and having a transverse groove thereon, a receptacle on the female part, a hollow keeper in said receptacle receiving said stud, spring latching means positioned in said receptacle engaging said groove, said hollow keeper being axially movably mounted within said receptacle in response to the action of an unlocking key for unlocking said grooved stud in response to the action of said key, said keeper being provided with camming surfaces bearing against said latching means for moving said latching means out of engagement with the groove in response to movement of said keeper so that said grooved stud is released, and spring urged means on said stud urging said stud from said receptacle and acting to positively separate the stud of the male part from locking position in said keeper when said spring latching means releases said stud.

2. A separable fastener having a male part and a female part, a stud on the male part mounted for axial movement relative to said male part and having a shank and tapered head and a transverse groove adjacent said head, a receptacle on the female part, a hollow keeper in said receptacle receiving said stud, wire spring latching means secured to said receptacle and having portions positioned in said receptacle engaging said groove and maintaining said stud in locked position when so engaged, said hollow keeper being axially movably mounted within said receptacle in response to the action of an unlocking key for unlocking said grooved stud in response to the action of said key, said keeper being provided with camming surfaces bearing against said latching means for moving said latching means out of engagement with the groove in response to movement of said keeper so that said grooved stud is released, and a helical spring around the shank of said stud urging said stud outwardly and acting to positively move said stud from locking position in said keeper when said spring latching means is disengaged from said groove.

3. A separable fastener having a male part and a female part, a stud axially movably mounted on the male part for relative movement thereon and having a shank and tapered head and a transverse groove adjacent said head, a receptacle on the female part, a hollow keeper having a substantially cylindrical wall portion in said receptacle receiving said stud, wire spring latching means secured to said receptacle and having spreadable tines extending through said receptacle and engaging said groove, said hollow keeper being axially movably mounted within said receptacle in response to the action of an unlocking key for unlocking said grooved stud in response to the action of said key, said keeper having cut out portions in this cylindrical wall portion providing camming surfaces bearing against said tines for moving said tines out of engagement with the groove in response to movement of said keeper so that said grooved stud is released, and a helical spring around the shank of said stud urging said stud outwardly from said receptacle and acting to positively move said stud from locking position in said keeper immediately upon disengagement of said tines from said groove.

4. A separable fastener having a male part and a female part, a stud axially movably mounted on the male part for relative movement thereon and having a shank and tapered head and a transverse groove adjacent said head, a receptacle on the female part, a hollow keeper having a substantially cylindrical wall portion in said receptacle receiving said head, wire spring latching means secured to said receptacle and having spreadable tines extending through said receptacle and engaging said groove, said hollow keeper being axially movably mounted within said receptacle in response to the action of an unlocking key for unlocking said grooved stud in response to the action of said key, said keeper having camming surfaces in its cylindrical wall portion bearing against said tines for moving said tines out of engagement with the groove in response to inward movement of said keeper so that said grooved stud is released, a housing fixed to said male part, a helical spring around the shank of said stud within said housing urging said stud outwardly from said receptacle and acting to positively move said stud from locking position in said keeper immediately upon disengagement of said tines from said groove in response to inward movement of said keeper.

5. A separable fastener having a male and a female part, a stud having a shank portion and tapered head portion on the male part and mounted for axial movement on the male part and having a groove in said shank portion adjacent said head portion and having a bore therethrough providing a passageway for an unlocking key, a receptacle fixed to said female part, a hollow keeper axially movably mounted within said receptacle receiving said stud, spring latching means secured to said receptacle engaging said groove and maintaining said stud in locked position when so engaged, said keeper being movable axially in response to the action of an unlocking key for unlocking said grooved stud in response to the action of said key, said keeper having a cylindrical side wall having cut out portions forming camming surfaces bearing against said latching means for moving said latching means out of engagement with said groove in response to inward movement of said keeper so that said grooved stud is released upon disengagement of said latching means from said groove.

6. A separable fastener having a male part and a female part, a stud mounted for axial movement on the male part and having a cylindrically shaped shank and tapered head, said stud having a longitudinal bore therethrough for insertion of an unlocking key, a transverse groove around said shank adjacent said head, a hollow keeper having a cylindrical side wall receiving said stud, a cylindrical receptacle on said female part, a latch spring wire secured to said receptacle and having tines engaging said groove and maintaining said stud locked when so engaged, said hollow keeper being mounted within said receptacle for axial movement therein and being movable axially in said receptacle in response to the action of an unlocking key inserted through said bore for unlocking said grooved stud in response to the action of said key, said keeper having a pair of oppositely disposed cut out portions in its cylindrical side wall portion forming camming surfaces bearing against said tines for moving them out of engagement with said groove in response to the movement of said keeper so that said grooved stud is released and unlocked, a housing fixed to said male part having a spring supporting shoulder, a flange fixed to said shank, a helical spring in said housing around said shank engaging said shoulder at one end and said flange at the other and urging said stud from said receptacle and positively moving said stud axially relatively to said male part and relatively to said keeper out of locking position immediately upon disengagement of said tines from said groove.

7. A separable fastener having a male part and a female part, a stud mounted on the male part for axial movement thereon and having a cylindrically shaped shank and tapered head, said stud having a longitudinal bore therethrough for insertion of an unlocking key, a transverse groove around said shank adjacent said head, said shank at its outer end having a bore larger than said first mentioned bore and axially aligned therewith, a rod forming a key axially movably mounted in said axially aligned bores, a button secured to the outer end of said key rod, a compression helical spring around said key rod urging said key outwardly, a shank sleeve surrounding said shank and secured to the male part, said stud being movable axially within said shank sleeve, a knob secured to the outer end of said shank, a frame sleeve concentric with said shank sleeve and secured to said male part and providing an annular space between said shank sleeve and frame sleeve, a stud ejecting compression spring in said space urging said knob and its attached stud outwardly, a hollow keeper having a cylindrical side wall receiving said stud, a cylindrical receptacle on said female part, a latch spring wire secured to said receptacle and having tines engaging said groove and maintaining said stud locked when so engaged, said hollow keeper being mounted within said receptacle for axial movement therein and being movable axially in said receptacle in response to inward pressure on said button for unlocking said grooved stud in response to the action of said key, said keeper having a pair of oppositely disposed cut-out portions forming camming surfaces bearing against said tines for moving them out of engagement with said groove in response to the movement of said keeper so that said grooved stud is released and unlocked, said stud ejecting spring positively moving said stud axially in said keeper out of locking position upon disengagement of said latching means with said groove and positively separating said male and female parts from locked engagement.

P. WROBLEWSKI.

REFERENCES CITED

The following references are of record in the file of this patent:

UNITED STATES PATENTS

| Number | Name | Date |
|---|---|---|
| 1,209,170 | Kravik | Dec. 9, 1916 |
| 1,309,382 | Wilson | July 8, 1919 |
| 1,412,459 | Davidson | Apr. 11, 1922 |
| 1,541,317 | Bellavance | June 9, 1925 |
| 1,661,520 | Wullum | Mar. 6, 1928 |
| 2,380,568 | Adams | July 31, 1945 |
| 2,442,398 | Chandler | June 1, 1948 |

FOREIGN PATENTS

| Number | Country | Date |
|---|---|---|
| 258,385 | Great Britain | Sept. 23, 1926 |